United States Patent [19]

Takagi et al.

[11] Patent Number: 5,216,711
[45] Date of Patent: Jun. 1, 1993

[54] TELEPHONE HANDSET INCLUDING DIRECTIONAL MICROPHONE MODULE

[75] Inventors: Hisamitsu Takagi, Inagi; Masashi Tomura, Tokyo, both of Japan

[73] Assignee: Fujitsu Limited, Kawasaki, Japan

[21] Appl. No.: 741,632

[22] Filed: Aug. 7, 1991

[30] Foreign Application Priority Data

Aug. 7, 1990 [JP] Japan ................... 2-207600

[51] Int. Cl.⁵ .............................................. H04R 25/00
[52] U.S. Cl. ................................. 379/433; 379/428; 381/155
[58] Field of Search ............... 379/433, 428, 429, 440; 381/155, 169

[56] References Cited

U.S. PATENT DOCUMENTS

| | | | |
|---|---|---|---|
| 4,463,222 | 7/1984 | Paradowski | 381/155 |
| 4,528,426 | 7/1985 | Fatovic et al. | 381/155 |
| 4,845,760 | 7/1989 | Awakowicz et al. | 379/433 |
| 4,850,016 | 7/1989 | Groves et al. | 379/433 |

Primary Examiner—Jin F. Ng
Assistant Examiner—Huyen D. Le
Attorney, Agent, or Firm—Staas & Halsey

[57] ABSTRACT

A telephone handset favorably fabricated in a compact size and yet providing a good S/N characteristic of the transmitter portion thereof. The telephone handset has a directional microphone module in its transmitter portion. The directional microphone module comprises a directional microphone having a first and a second sound collector provided on the upper side and the under side thereof and a bush formed of an elastic material having its peripheral wall receiving the directional microphone in such a manner that the outer peripheral surface of the directional microphone is tightly fit to the inner surface of the peripheral wall. The telephone handset is formed of a front case and a rear case to be put together. In the interior of the front case, there is defined a microphone module receiving portion by a rib and the inner wall surface thereof and the microphone module is received therein.

4 Claims, 5 Drawing Sheets

TELEPHONE HANDSET INCLUDING DIRECTIONAL MICROPHONE MODULE

BACKGROUND OF THE INVENTION

1. Field of the Invention

The present invention relates to a directional microphone module and a telephone handset for a portable telephone and the like provided with the module.

2. Description of the Related Art

A telephone handset is integrally formed of a transmitter including a microphone and a receiver including a speaker. For convenience of operation, some handsets lately developed are provided thereon with a switch portion, including a dialing means and the like. In portable telephones and cordless phones, the power source and transmission/reception circuits are incorporated in the handset itself. In order to obtain a compact telephone handset of the described type, if the transmitter and the speaker in a handset are brought close to each other, then, since the handset is generally used with the receiver held in contact with the ear, the transmitter of the handset is brought away from the mouth and, hence, the N/S characteristic of the transmitter is deteriorated. Therefore, it is difficult in general to obtain both the advantages, compactness of the handset and a good S/N characteristic of the transmitter, at the same time and, accordingly, there are demands for a telephone handset by which both the advantages are obtained at the same time.

There has so far been proposed an arrangement to use a directional microphone in the transmitter to improve the S/N characteristic of the transmitter of a compact telephone handset in which the transmitter and the receiver are set close to each other. By the use of such directional microphone, it is expected that sounds other than the voice made by the operator will not be collected by the microphone and the S/N characteristic of the transmitter will thereby be improved.

However, the directional microphone is such that exhibits good directivity only when the microphone is disposed in a free space and does not exhibit good directivity when it is disposed within a closed, small case such as a handset. Accordingly, a good S/N characteristic of the transmitter cannot be attained by mere mounting of a directional microphone in the transmitter portion.

SUMMARY OF THE INVENTION

Accordingly, an object of the present invention is to provide a telephone handset favorably fabricated in a compact size and which has a good S/N characteristic at its transmitter.

Another object of the present invention is to provide a directional microphone module suitable for use in a compact telephone handset.

In accordance with an aspect of the present invention, there is provided a directional microphone module comprising: a directional microphone having first and a second sound collecting holes provided on the upper side and the under side thereof; and a housing formed of an elastic material having a peripheral wall for receiving the directional microphone in such a manner that the outer peripheral surface of the directional microphone is tightly fit to the inner surface of the peripheral wall; wherein the bush has a first opening formed at a position opposing the first sound collecting holes, has a space defined at a position opposing the second sound collecting holes, a second opening communicating with the space formed in the peripheral wall thereof, and a flange integrally formed at its end portion opposite to the end portion where the first opening is formed.

When a directional microphone having first and second sound collecting holes is disposed in an open space, the path through which a sound from a sound source located at the side of the microphone is propagated to reach the acoustical/electrical converter through the first sound collecting hole and the path through which the sound from the sound source is propagated to reach the acoustical/electrical converter through the second sound collecting hole are virtually equal and therefore these sounds cancel each other in the acoustical/electrical converter, and from this, the directivity of the microphone develops. Accordingly, good directivity cannot be obtained by merely placing a directional microphone in a closed case.

Since the directional microphone module of the present invention has the first opening formed in the housing at the position opposing the first sound collecting hole, has the space defined in the housing at the position opposing the second sound collecting hole, and has the second opening communicating with the space formed in the peripheral wall of the housing, the directivity of the directional microphone module is not deteriorated virtually even if it is placed in the case of the telephone handset. The purpose of placing the directional microphone in the housing such that the peripheral surface of the directional microphone is tightly fit to the inner wall surface of the housing is to prevent the directivity from being deteriorated by allowing a gap to be formed between the peripheral surface of the directional microphone and the inner wall surface of the housing. Further, the purpose of forming the housing of an elastic material and providing a flange at one end portion of the bush is to keep the directivity high by obtaining good closeness when the directional microphone module is placed in the case of the telephone handset.

The above and other objects, features, and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
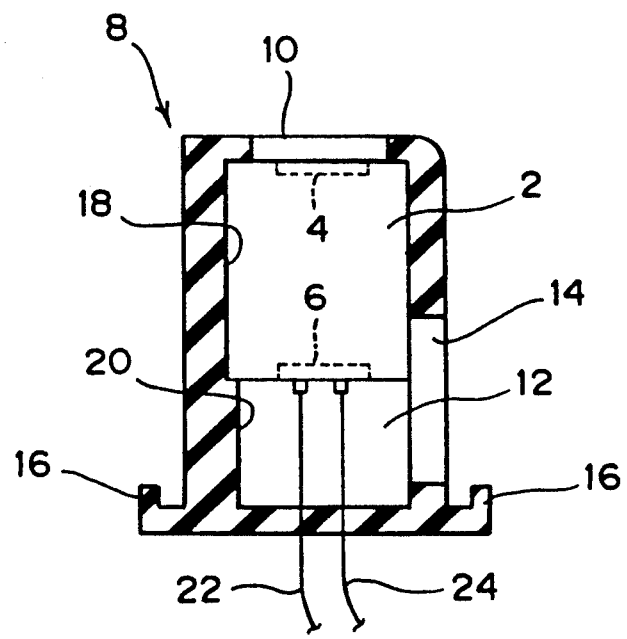
FIG. 1 is a sectional view of a directional microphone module according to an embodiment of the present invention.
Figure 2:
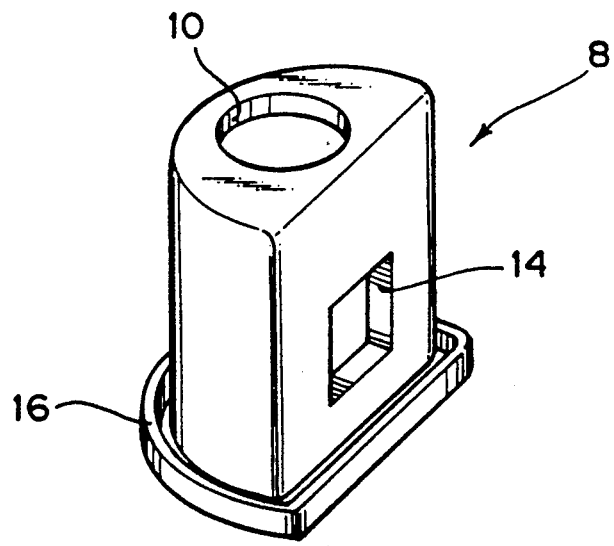
FIG. 2 is a perspective view of the housing shown in FIG. 1.

Referring to FIG. 1 and FIG. 2, a directional microphone module according to an embodiment of the present invention will now be described. Reference numeral 2 denotes a directional microphone provided with a first sound collecting hole 4 and a second sound collecting hole 6 formed on the upper and under sides thereof. Reference numeral 8 denotes a housing, formed of an elastic material such as rubber, for receiving the directional microphone 2. The housing 8 has a first opening 10 formed therein at a position to oppose the first sound collecting hole 4 of the directional microphone 2 when the directional microphone is received therein and has a space 12 for securing directivity of the microphone defined at a position to confront the second sound collector 6. In the peripheral wall of the bush 8, there is formed a second opening 14 communicating with the space 12.

At the end portion opposite to the end portion in which the first opening 10 is formed, there is provided a flange 16. By means of this flange 16, closeness of the microphone module is easily secured when it is placed in the case of the telephone. When putting the directional microphone 2 into the housing 8, the directional microphone 2 is pushed into the housing through the second opening 14 and the directional microphone 2 is set in place by means of a step formed between a thin-wall portion 18 and a thick-wall portion 20 of the peripheral wall of the housing 8. Reference numerals 22 and 24 denote lead wires for the directional microphone 2 passing through the bottom portion of the housing 8.

Figure 3:
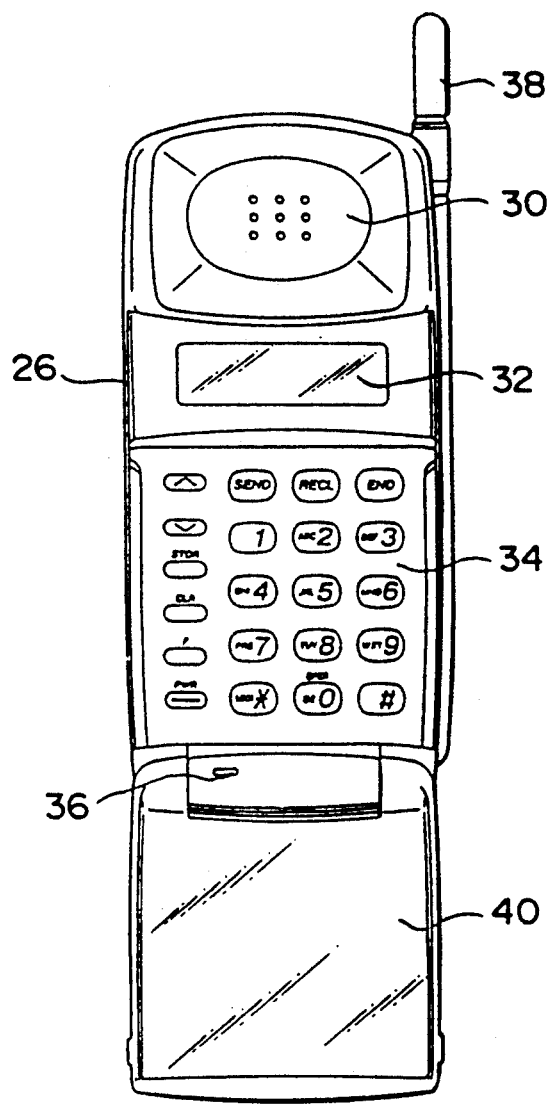
FIG. 3 is a plan view of a portable phone employing a directional microphone module shown in FIG. 1.
Figure 4:
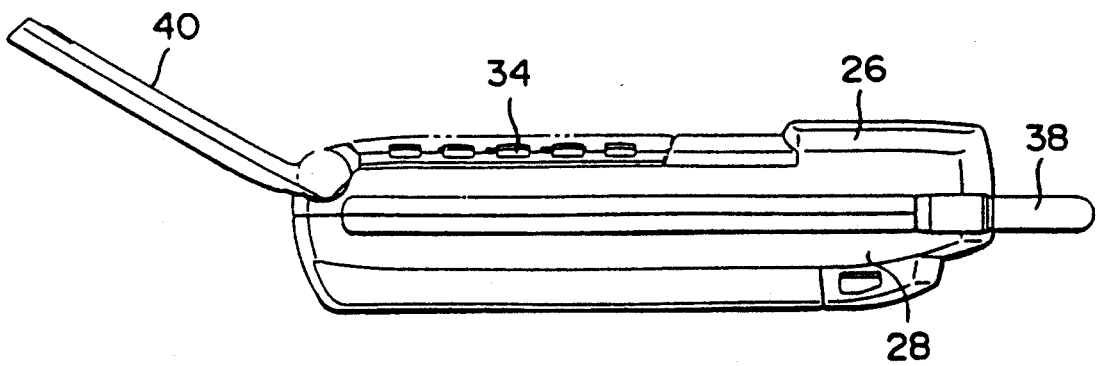
FIG. 4 is a side view of the portable phone employing a directional microphone module shown in FIG. 1.

Referring to FIG. 3 and FIG. 4, structure of a portable phone or a telephone handset incorporating the directional microphone module of the above described structure will be described below. The portable phone is formed of its front case 26 and rear case 28 put together with a transmission/reception circuit board and the like contained therein. At the upper end portion of the front case 26, there is provided a receiver portion 30 including a speaker, and at the middle portion of the front case 26, there are provided a display portion 32 formed of a liquid crystal display or the like and a switch portion 34 including a dialing means and the like. At the lower left corner of the front case 26, there is provided a transmitter portion 36 containing the directional microphone module of the above described structure. The purpose of providing the transmitter portion 36 not in the center of the lower end portion but at one corner thereof is to obtain as large a distance as possible between the receiver portion 30 and the transmitter portion 36 in the compact portable phone. On a side wall of the front case 26, there is mounted an antenna 38 capable of being pulled out for use and pushed back into its retained position.

Toward the lower end of the front case 26, there is provided a cover 40 for being opened and shut. The cover 40 when shut covers at least the switch portion 34 and when opened functions as a reflective sound collecting plate. Since, in the present embodiment, the directional microphone module is mounted in the transmitter portion 36, the cover functioning as the reflective sound collecting plate may be omitted.

Figure 5:
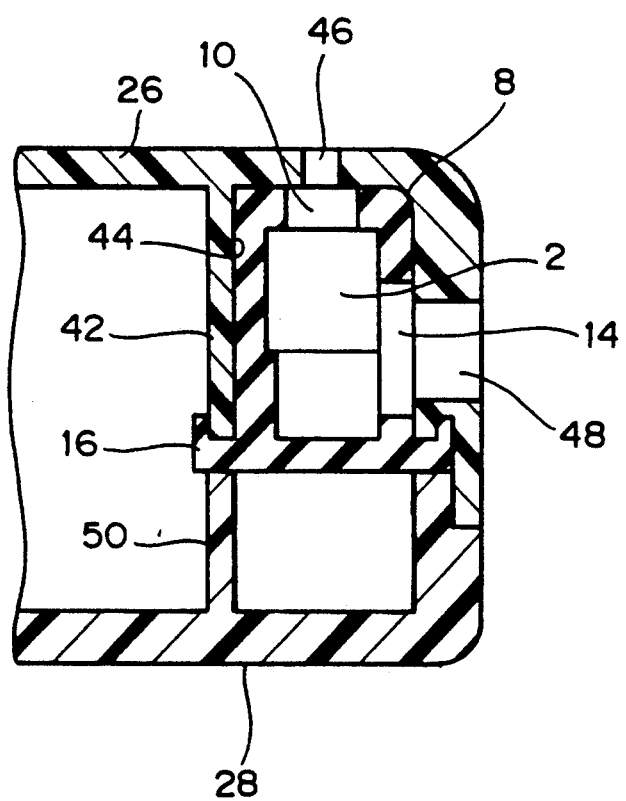
FIG. 5 is a sectional view of the portion around the transmitter of the portable phone.

Referring now to FIG. 5, there is formed, in the interior of the front case 26 of the portable phone, a receiving portion 44 defined by the inner wall surface of the front case 26 and a rib 42 projecting from the inner wall surface for receiving the directional microphone module. That is, the directional microphone module shown in FIG. 1 is received in this receiving portion 44. In the front case 26, there is formed an opening 46 functioning as the transmitter portion in a position opposing the first opening 10 of the housing 8 and an opening 48 in a position opposing the second opening 14 of the housing 8. The rear case 28 is integrally provided with a rib 50 projecting from its inner wall surface. The directional microphone module is fixed to the front case 26 and the rear case 28 by having the flange 16 thereof held between the rib 42 of the front case and the rib 50 of the rear case.

According to the above described arrangement, the sound from the outside of the portable phone is let in through the opening 46 of the front case 26 and the first opening 10 of the directional microphone module to reach the first sound collecting hole 4 of the directional microphone 2 and also let in through the opening 48 of the front case 26 and the second opening 14 of the directional microphone module to reach the second sound collecting hole 6 of the directional microphone. Accordingly, the directivity with respect to the sound let in through the opening 46 is improved and the S/N characteristic of the transmitter portion is enhanced. Thus, the compact portable phone with the transmitter portion and the receiver portion of the portable phone brought close to each other can be produced.

Since the housing 8 is formed of an elastic material such as rubber and the housing 8 is disposed so as to tightly fit to the front case 26, a conduction noise to the portable phone such as an impulsive sound hardly reaches the directional microphone 2. Further, since the directional microphone module received in the receiving portion 44 of the front case 26 is adapted to be secured within the case with the front case 26 and the rear case 28 put together, good productivity of the portable phone can be obtained.

Now, referring to FIG. 6A to FIG. 7B, description will be given as to what effects the opening 48 formed at the bottom portion of the portable phone has on the directivity of the directional microphone module.

Figure 6A:
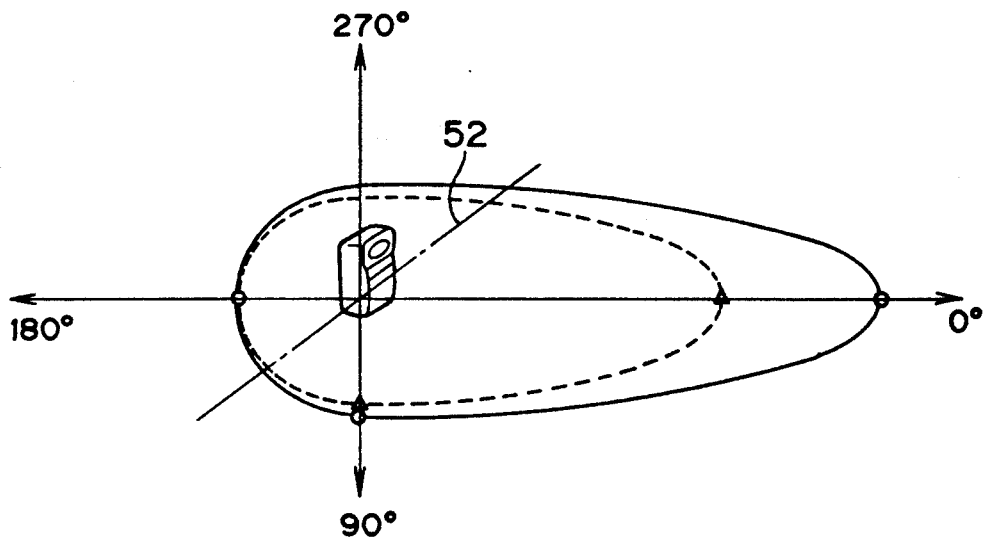
FIG. 6A is a schematic diagram showing vertical directivity of a directional microphone incorporated in a portable phone, in which the solid line indicates the case where the cover is opened and the broken line indicates the case where the cover is shut.
Figure 6B:
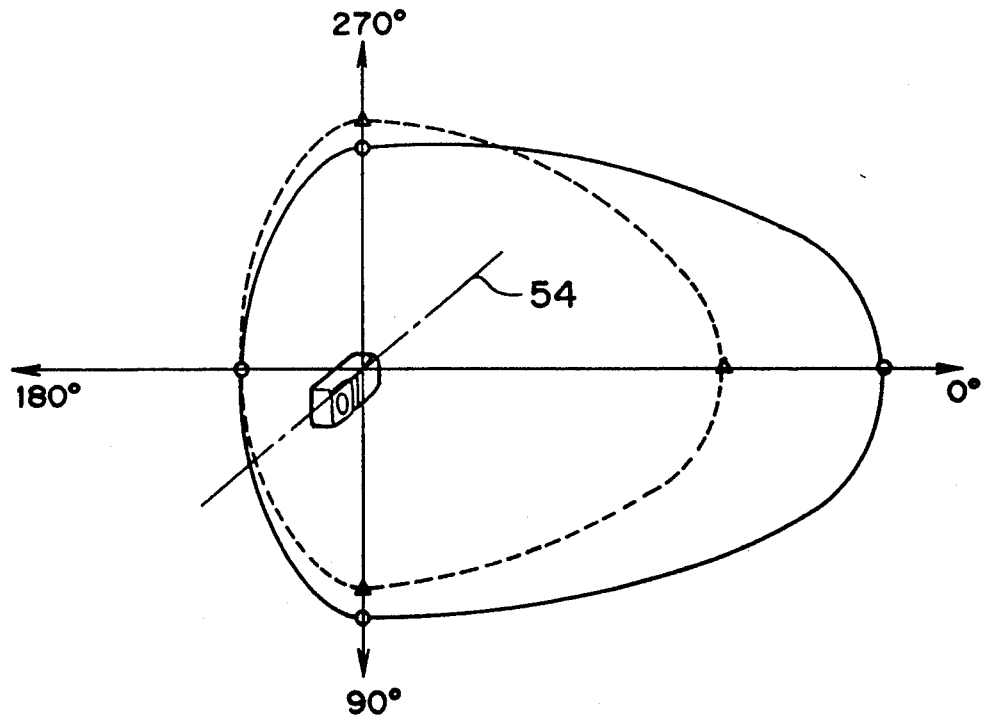
FIG. 6B is a schematic diagram showing horizontal directivity of a directional microphone incorporated in a portable phone, in which the solid line indicates the case where the cover is opened and the broken line indicates the case where the cover is shut.

FIG. 6A shows the directivity of a directional microphone when the directional microphone is received in a portable phone having openings 46 and 48 and the portable phone is rotated round the axis 52, that is, the vertical directivity of the microphone, and FIG. 6B shows the directivity of the microphone when the portable phone is rotated round the axis 54, that is the horizontal directivity of the microphone. In FIG. 6A and FIG. 6B, the axes of rotation 52 and 54 in reality are vertical to the surface of the paper. The solid line and the broken line indicate the directivity when the cover is opened and the cover is shut, respectively.

As apparent from FIG. 6A and FIG. 6B, the directional microphone module has sharp directivity especially in the vertical direction shown in FIG. 6A.

Figure 7A:
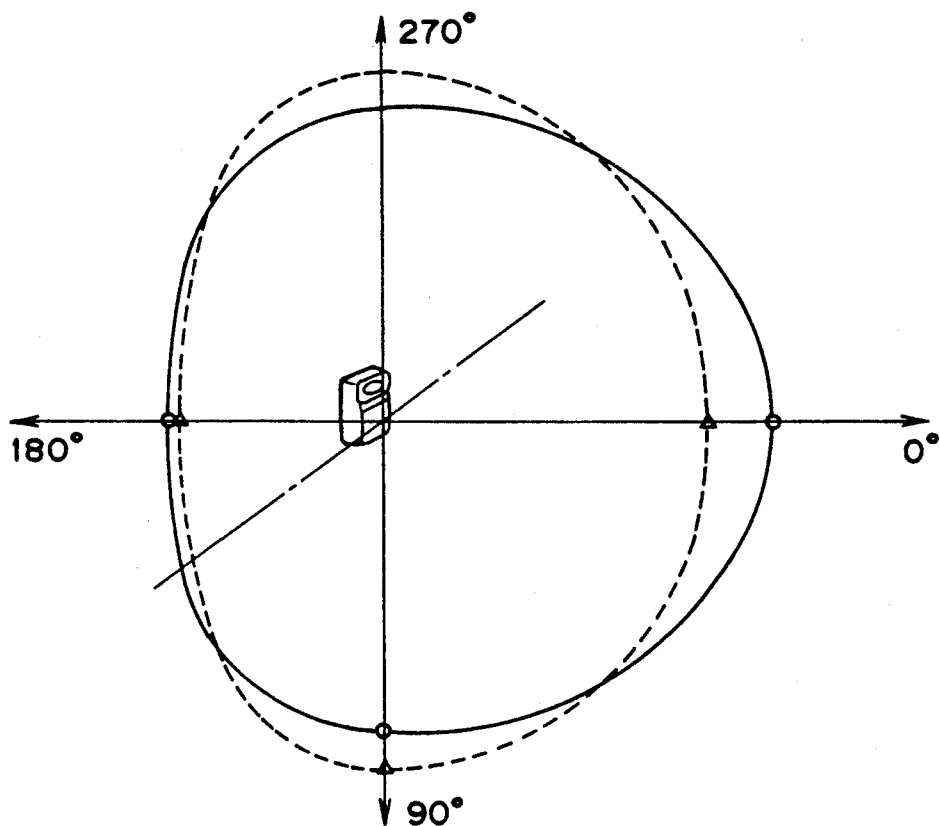
FIG. 7A is a schematic diagram, corresponding to FIG. 6A, showing directivity when the opening at the lower portion of the portable phone is closed.
Figure 7B:
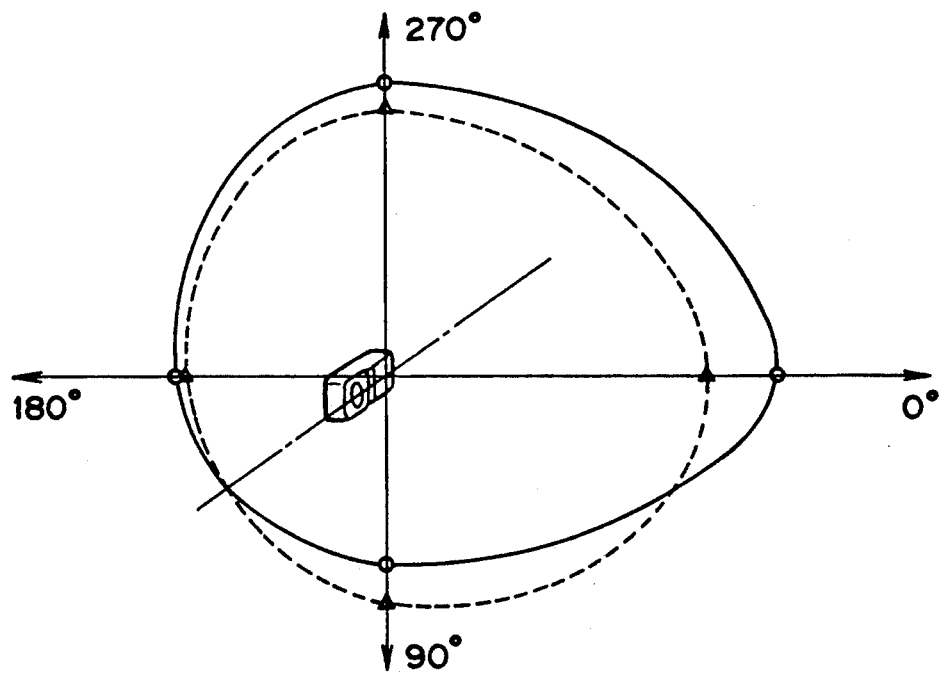
FIG. 7B is a schematic diagram, corresponding to FIG. 6B, showing directivity when the opening at the lower portion of the portable phone is closed.

FIG. 7A and FIG. 7B show the directivity of the directional microphone corresponding to FIG. 6A and FIG. 6B when the opening 48 of the portable phone was stopped up with clay, respectively. As understood by comparing FIG. 7A and FIG. 7B with FIG. 6A and FIG. 6B, the directivity of the microphone is markedly deteriorated when the opening 48 is stopped up with clay. From this, the importance of providing the opening 48 in the portable phone for taking in sound through the opening 48 so as to be received by the directional microphone 2 through the second opening 14 formed in the directional microphone module can be understood.

What is claimed is:

1. A directional microphone module for use in a telephone handset, comprising:
   a directional microphone having first and second sides, an outer peripheral surface, and first and second sound collecting holes provided in proximity to the first side and second side, respectively; and
   a housing formed of an elastic material having a peripheral wall for receiving said directional microphone so that the outer peripheral surface of said directional microphone is tightly fit to an inner surface of said peripheral wall, said housing defining a space at a position opposing said second sound collecting hole, said housing having a first opening formed at a position opposing said first sound collecting hole, a second opening communicating with said space formed in the peripheral wall thereof, and a flange integrally formed substantially around an entirety of its end portion opposite to the end portion where said first opening is formed, the flange being for securing said housing between first and second portions of the telephone handset.

2. A directional microphone module according to claim 1, wherein the peripheral wall of said housing includes a thin-walled portion and a thick-walled portion with a step formed therebetween, and said microphone is supported at the second side on said step.

3. A directional microphone module according to claim 2, wherein said elastic material is rubber.

4. A telephone handset incorporating a directional microphone module, said directional microphone module including a directional microphone having first and second sides, an outer peripheral surface, and first and second sound collecting holes provided in proximity to the first side and the second side, respectively and a housing formed of an elastic material having a peripheral wall for receiving said directional microphone so that the outer peripheral surface of said directional microphone is tightly fit to an inner surface of said peripheral wall, said housing defining a space at a position opposing said second sound collecting hole, said housing having a first opening formed at a position opposing said first sound collecting hole, a second opening communicating with said space formed in the peripheral wall thereof, and a flange integrally formed at its end portion opposite to the end portion where said first opening is formed, said telephone handset comprising:
   a front case having an inner wall surface, and a first rib integrally projected from the inner wall surface, said first rib and the inner wall surface defining a receiving portion for receiving said directional microphone module, said front case having a third and a fourth opening formed at positions respectively opposing said first and second openings when said directional microphone module is received in said receiving portion; and
   a rear case having a second rib integrally formed therewith at a position opposing said first rib,
   said directional microphone module adapted such that, when said front case and said rear case are joined, said flange is held between said first rib and said second rib of said front case and said rear case, respectively, thereby fixing said directional microphone module to said front case and said rear case.

* * * * *

UNITED STATES PATENT AND TRADEMARK OFFICE
CERTIFICATE OF CORRECTION

PATENT NO. : 5,216,711
DATED : June 1, 1993
INVENTOR(S) : Hisamitsu TAKAGI et al.

It is certified that error appears in the above-indentified patent and that said Letters Patent is hereby corrected as shown below:

- Column 1, line 66, change "bush" to --housing--.

- Column 3, line 25, change "collector" to
    --collecting hole--.

- Column 3, line 26, change "bush" to --housing--;

- Column 3, line 35, after "housing" insert --8--.

Signed and Sealed this

First Day of March, 1994

Attest:

BRUCE LEHMAN

Attesting Officer

Commissioner of Patents and Trademarks